Jan. 29, 1929.
J. F. WHITEHEAD ET AL
1,700,524
MIRROR SUPPORT
Filed March 5, 1925
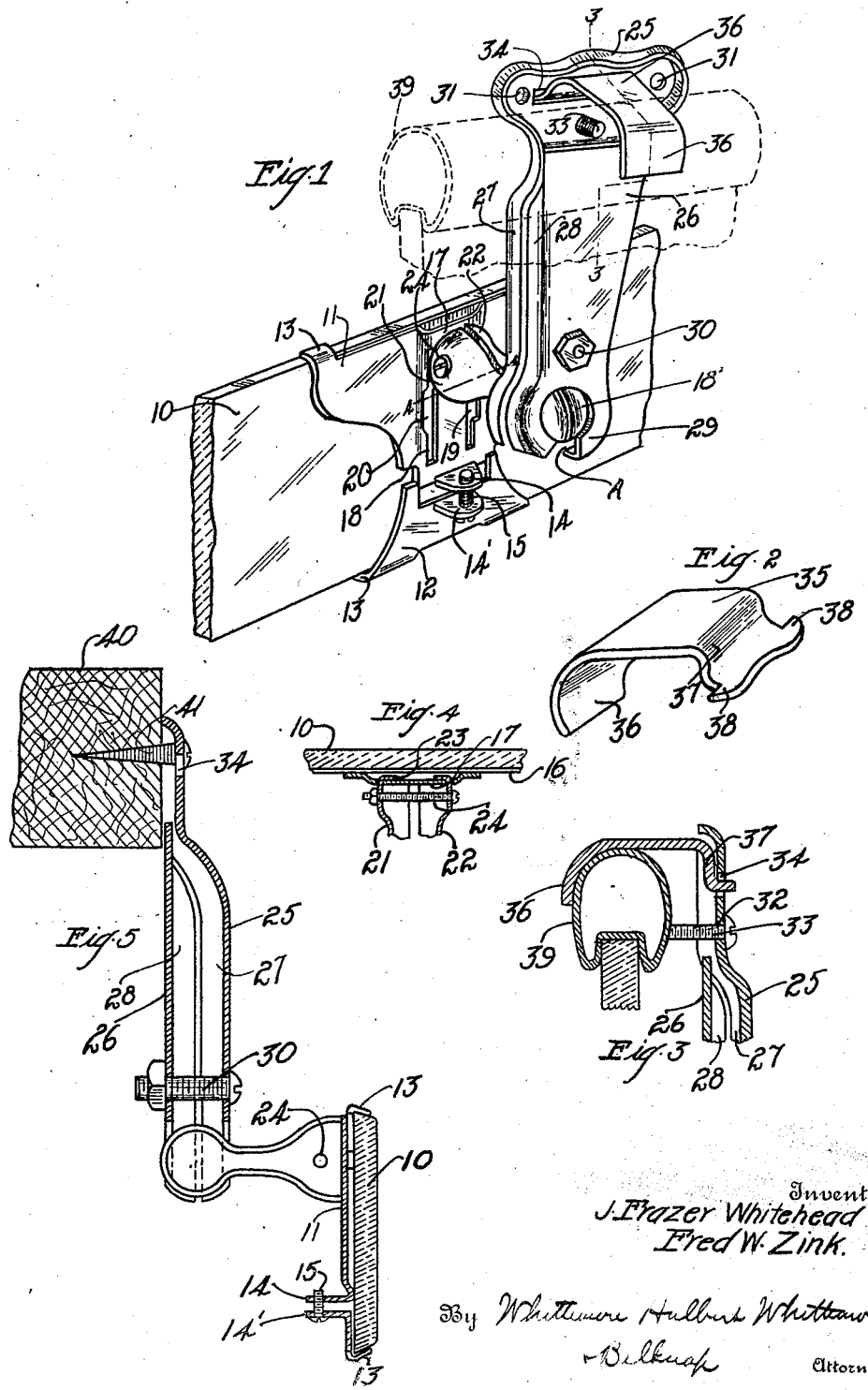

Patented Jan. 29, 1929.

1,700,524

UNITED STATES PATENT OFFICE.

JAMES FRAZER WHITEHEAD AND FRED W. ZINK, OF DETROIT, MICHIGAN, ASSIGNORS TO KALES STAMPING COMPANY, OF DETROIT, MICHIGAN, A CORPORATION OF MICHIGAN.

MIRROR SUPPORT.

Application filed March 5, 1925. Serial No. 13,331.

The invention relates to mirror supports and has for an object to provide a rear view mirror for vehicles. A further object is to provide a mirror which may be adjusted to a plurality of positions. A still further object of the invention resides in the provision of a mirror support adapted for use in either open or closed cars.

With these and other objects in view, the invention resides in the novel features of construction and combination and arrangements of parts as more fully hereinafter described and claimed.

Referring to the drawings:—

Figure 1 is a vertical sectional view showing the mirror when associated with an open car;

Figure 2 is a detail perspective view of the attaching clip;

Figure 3 is a fragmentary section view along 3—3 of Figure 1;

Figure 4 is a fragmentary section view along 4—4 of Figure 1; and

Figure 5 is a view showing the mirror when associated with a closed car.

In the drawings, reference character 10 indicates a mirror embraced at opposite edges respectively by the bent over portions 13 of the complementary clamping members 11 and 12. The clamping members 11 and 12 are preferably metal stampings and may be formed with the clamping lugs 14 and 14' respectively. 15 indicates a clamping screw for drawing together the members 11 and 12 and causing the same to firmly embrace the mirror. A strip of material 16 such as paper may be placed between the mirror back and the clamping members.

One of the clamping members, such as the member 11, may extend a greater portion transversely of the mirror while the member 12 is correspondingly shorter as shown in Figure 1. The member 11 may also have a raised portion 17 extending longitudinally thereof, said portion having slots 18 and 19 each of which may be formed with additionally cut-away portions at 20 for introducing the slot engaging parts referred to hereafter.

21 and 22 are complementary members formed at one end with bent end 23 for sliding engagement with the slots 18 and 19, and at the other the members 21 and 22 are formed into a part of a universal joint A, such as the ball 18'. 24 indicates a fastener for drawing together the members 21 and 22 and clamping them in various positions of adjustment along the slots 18 and 19.

For universally mounting the mirror from a fixed part of the vehicle, we provide the complementary supporting bracket members 25 and 26 preferably having their side edges longitudinally bent at 27 and 28 respectively and terminally formed into a socket 29 engageable by the ball 18' to form the universal joint A. 30 indicates a clamping screw for holding the members 25 and 26 in assembled position. The member 26 is provided with a plurality of openings 31 adapted to receive headed fasteners for mounting the mirror support on a closed car as hereafter described. An opening 32 is also provided, threaded for engagement by the set screw 33; also a slot 34. 35 indicates an attaching clip having a hook portion 36 at one end and a shoulder 37 and the offset portions 38 at the other end. The slot 34 is sufficiently wide to receive the hook end 36 of the clip whereby the latter may be positioned as shown in Figure 1, the offsets 38 preventing disengagement with the member 26. With the clip 35 in place the hook portion 36 may be engaged with the windshield frame 39 which in open cars affords a convenient part for supporting the mirror. However, it is obvious that any other part of the car may be engaged as desired. It may, for example, be desired to position the mirror extending from the side of the car in which instance the hook 36 may be engaged with any suitable vertically extending rod or the like. After engagement of the hook 36 the set screw 33 is tightened to produce a tension in the parts whereby the mirror is rigidly supported.

When it is desired to secure the mirror to a support by reason of headed fasteners or the like, as is ordinarily desirable in the common closed type of car, the clip 35 is removed from slot 34 and the member 25 placed adjacent the desired part of the car as 40, and fasteners 41 are applied through the aforesaid openings 31.

It will thus be noted that the mirror support is equally adapted for use in open or closed cars, the readily attachable and removable clip 35 accommodating engagement with curved parts of the car.

In mirrors of the rear view type, such as are mounted on motor vehicles, difficulty has been experienced in supporting the mirror from the vehicle in such a position that the view in the rear is readily and properly observed by the occupant of the car. Our invention affords a wide range of adjustments so as to adapt the mirror to various types of vehicles and also suitable for occupants of various heights.

For example, the slots 18 afford relative sliding adjustment between the mirror and the complementary members 21, 22 whereby without disturbing the connection with the car, the mirror may be adjusted so as to be suitably positioned. Furthermore, by reason of the universal connection at A, the mirror may be inclined at any angle desired and may also be rotated in its plane through 360°. It will thus be noted for example, that without disturbing the adjustment of any of the parts, the mirror may be rotated 180°, which, in the relative position of the parts as shown in the drawings, will cause the mirror to be elevated. It should be understood, however, that if desired, the axis of the members 21, 22 may be positioned to pass through the center of the mirror instead of being offset therefrom as shown in Figure 1.

While it is believed that from the foregoing description, the nature and advantage of our invention will be readily understood, we desire to have it understood that we do not limit ourselves to what is herein shown and described and that such changes may be resorted to when desired as fall within the scope of the claims.

What we claim as our invention is:—

1. In combination with a vehicle mirror, complementary clamping members embracing the mirror, one of said members provided with a pair of slots, complementary members having at one end thereof bent ends slidably engaging in said slots respectively whereby said mirror may be adjusted to a plurality of positions vertically with respect to said complementary members, the said complementary members being formed at their other ends into a ball, complementary bracket members attachable at one end with a fixed part of the vehicle and formed at their other ends into a socket engageable with said ball for affording universal movement of the mirror.

2. In combination with a vehicle mirror, a supporting bracket therefor provided with a plurality of openings and a slot, a headed hook shaped member engageable in said slot with the head engaging said bracket for fastening the bracket to a curved part of the vehicle and other members engageable in said openings for securing the bracket at other times with substantially plane surfaces of the vehicle.

3. In combination with a vehicle mirror, a mirror holding member provided with a slot substantially parallel to the plane of the mirror and extending from a point beyond the center of the mirror to adjacent the edge thereof, a laterally extending arm provided with return bent portions adjustably engaging said slot, and means including a ball and socket joint for universally attaching said second member to a fixed part of the vehicle.

4. In combination with a vehicle mirror, clamping members spanning the mirror and embracing opposite edges thereof, one of said clamping members provided with a raised portion substantially parallel with the plane of the mirror, said raised portion having two spaced elongated slots cut out therefrom and extending from a point beyond the center of the mirror to adjacent a longitudinal edge thereof, and a member having bent ends engaging said slots and adapted to slide longitudinally thereof for adjusting the mirror to a plurality of positions vertically with respect to said member.

5. In combination, a vehicle mirror, a holder therefor having portions gripping two edges of said mirror and having a portion substantially parallel to the back of said mirror, said last mentioned portion having two substantially parallel slots therein extending from a point adjacent to the center of said mirror to one of the edges aforesaid of said mirror, and a supporting arm for the mirror having projections at one end slidably engaging said slots.

6. In combination, a vehicle mirror, a supporting bracket therefor having a substantially flat attaching portion with a transversely extending elongated slot and an attaching clip detachably associated with said portion for mounting said bracket on a curved surface such as a rail of a windshield frame, said clip comprising a member having a hook-shaped end for engagement with the windshield rail and having a shoulder at its upper end normally in said elongated slot, said shoulder having a lateral projection engaging the back of the attaching portion of said bracket and serving to hold the shoulder aforesaid in said slot when said hook-shaped portion is in engagement with the said windshield rail.

7. In combination, a vehicle mirror, a supporting bracket therefor having a substantially flat portion for attachment to the windshield header of a closed vehicle body, said flat portion being provided with a transversely extending elongated slot, and means associated with said flat portion for attaching said bracket to a curved surface such as a rail of a windshield frame, said means comprising a one piece clip having a hook-shaped end for engagement with the windshield rail and having a shoulder or off-set portion normally within the elongated slot aforesaid, said shoulder or off-set portion being provided with an extension normally engaging the back of said flat portion and serving to hold the shoulder or off-set portion aforesaid in said slot.

8. In combination, a mirror, a holder therefor having portions embracing two edges of said mirror, and supporting means for said holder and mirror including an arm having an end connected to said holder and slidable in said holder from approximately the center of said mirror to one of the edges aforesaid of said mirror.

In testimony whereof we affix our signatures.

J. FRAZER WHITEHEAD.
FRED W. ZINK.